United States Patent [19]
Ferraiolo et al.

[11] 4,044,295
[45] Aug. 23, 1977

[54] OVER-VOLTAGE INTERRUPT FOR A PHASE CONTROLLED REGULATOR

[75] Inventors: Frank A. Ferraiolo, Newburgh; Roy K. Griess, Wappingers Falls, both of N.Y.

[73] Assignee: International Business Machines Corporation, Armonk, N.Y.

[21] Appl. No.: 755,285

[22] Filed: Dec. 29, 1976

[51] Int. Cl.² .......................................... H02M 1/18
[52] U.S. Cl. ...................................... 363/54; 363/87
[58] Field of Search .................... 321/5, 11, 14, 18

[56] References Cited

U.S. PATENT DOCUMENTS

| | | | |
|---|---|---|---|
| 3,611,086 | 10/1975 | Mokrytzki et al. | 321/5 X |
| 3,719,873 | 3/1973 | Graf | 321/5 X |
| 3,733,540 | 5/1973 | Hawkins | 321/18 X |
| 3,800,198 | 3/1974 | Graf et al. | 321/14 X |
| 3,840,798 | 10/1974 | Burchall et al. | 321/11 X |
| 3,848,175 | 11/1974 | Demarest | 321/11 |
| 3,986,047 | 10/1976 | Griess | 323/24 X |

*Primary Examiner*—William M. Shoop

*Attorney, Agent, or Firm*—Harold H. Sweeney, Jr.

[57] ABSTRACT

An over-voltage interrupt circuit is provided which senses the local output of the phase controlled regulator. A reference is generated which is utilized in a comparator as the over-voltage threshold. When the sensed regulator output is above this threshold setting an override signal is produced which overrides the condition of the on/off control. The comparator is arranged to have a lower reset threshold value than the setting threshold so that the on/off control is again switched in response to the sensed voltage dropping below the reset threshold level. If the over-voltage condition persists, the comparator continues to set and reset and, accordingly, the on/off control is continually switched off and on giving a limited average voltage output from the regulator. The on/off control operates through a walk-in circuit which controls the voltge during turn on and off to prevent over and undershoot voltage problems. The active capacitor is also turned off by an over-voltage condition recognized by the comparator and remains off as long as the over-voltage condition persists.

9 Claims, 5 Drawing Figures

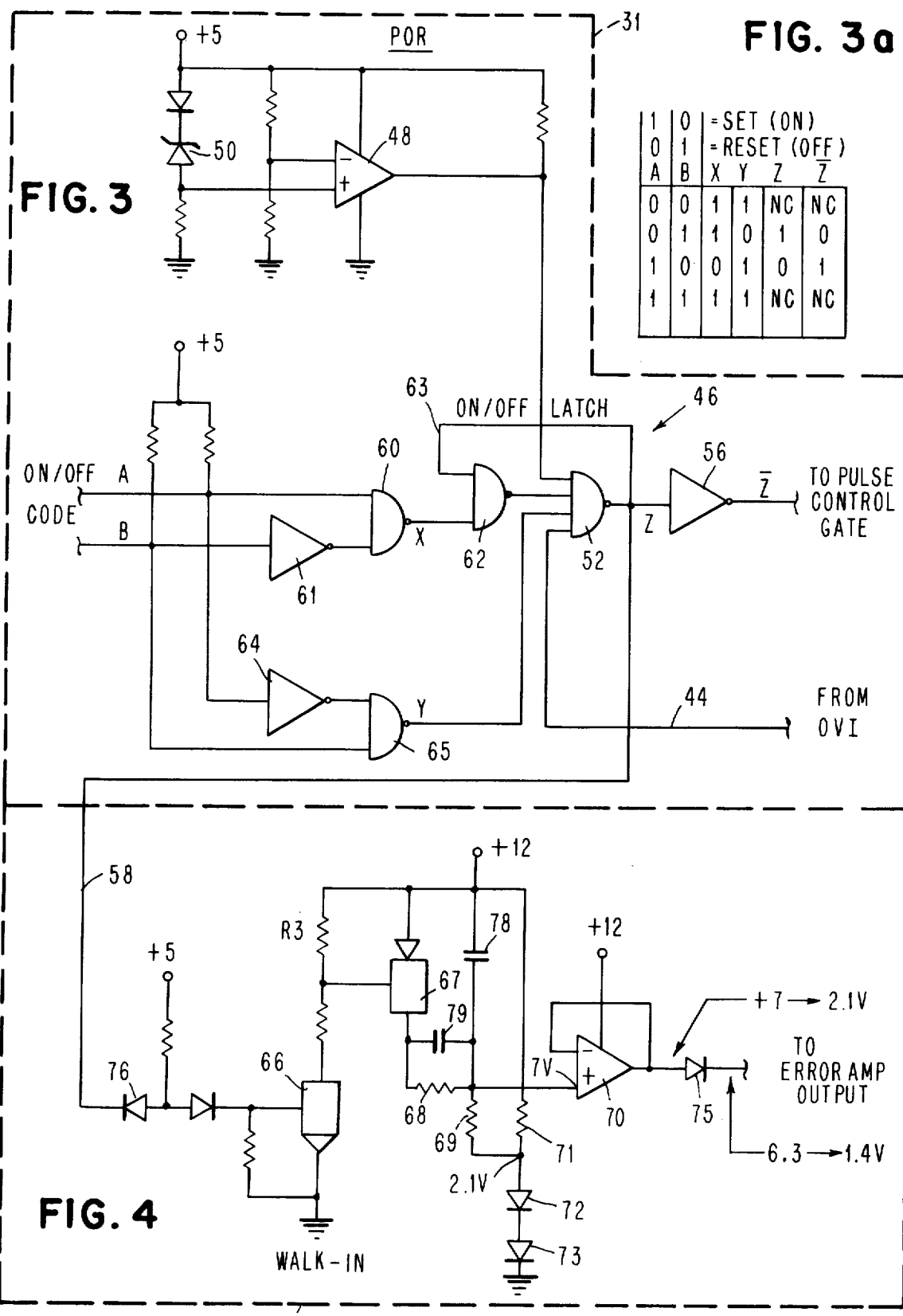

OVER-VOLTAGE INTERRUPT FOR A PHASE CONTROLLED REGULATOR

BACKGROUND OF THE INVENTION

Statement of the Invention

The invention relates to an over-voltage circuit for a phase controlled regulator and, more particularly, to an over-voltage circuit which places the regulator in a continuous off/on mode in response to an over-voltage as long as the over-voltage persists.

The main function of prior art over-voltage interrupt arrangements has been to shut down to protect the subsequent circuitry from destructive over-voltages. Accordingly, the over-voltage interrupt circuits have consisted of what are popularly known as "crowbar" circuits which short circuit the output voltage of the regulator in response to an over-voltage and perhaps trip a circuit breaker. A popular "crowbar" element has been a silicon controlled rectifier (SCR) which is tied directly across the outputs of the regulator. There are a number of disadvantages of this type of over-voltage interrupt circuitry, such as the necessity of manually resetting the circuit breaker. These type circuits, for all practical purposes, are fast in order to protect the load from damage or destruction. However, the "crowbar" requires an adjustment to speed in order to prevent a large number of nuisance trips due to noise.

Earlier attempts have been made to limit the output voltage of the regulator in response to an over-voltage condition by turning the gate pulse on and off directly in the case of a silicon controlled rectifier (SCR) phase controlled regulator. However, large voltage excursions were experienced at the output of the regulator.

SUMMARY OF THE INVENTION

It is the main object of the present invention to provide an over-voltage interrupt for a phase controlled regulator which prevents the regulator from operating in the catastrophic over-voltage region where loads would be damaged, but does not shut off the regulator permanently.

It is another object of the present invention to provide an over-voltage interrupt circuit for a phase controlled regulator which intercepts a catastrophic over-voltage and holds the regulator in a controlled repetitive off/on sequence until the over-voltage subsides, or the regulator is turned off.

It is a further object of the present invention to provide an over-voltage interrupt for a phase controlled regulator which can be made to respond fast to an over-voltage and which does not require a speed adjustment to prevent nuisance trips due to noise.

It is another object of the present invention to provide an over-voltage interrupt circuit for a phase controlled regulator which provides a fast turn-off with minimum voltage overshoot and similarly a turn-on with a minimum of voltage overshoot.

It is yet another object of the present invention to provide an over-voltage interrupt for a phase controlled regulator which controls the active capacitor to reduce over and undershoot and ripple when the regulator is in the over-voltage interrupt mode.

Briefly, an over-voltage interrupt circuit is provided for a phase controlled regulator wherein the output of the regulator is sensed and applied to a comparator. A reference voltage is generated and utilized as the other input to the comparator. The reference establishes an upper threshold which when exceeded by the sensed voltage provides an output from the comparator. A resetting threshold is established in the comparator which is lower than the setting threshold. The outputs of the comparator are connected to an on/off controller means through a fast switching means which provides an override signal to the on/off controller which turns the regulator off in response to a sensed output above the setting threshold and turns the regulator on in response to a sensed output below the resetting threshold, thereby providing output voltage excursions between the setting and resetting threshold in response to an over-voltage.

In the case of a silicon controlled rectifier phase controlled regulator, the on/off switching of the regulator is accomplished by inhibiting the gate pulses for fast turn-off and minimum overshoot and a walk-in circuit which forces a phase back to a firing angle that will guarantee a soft turn-on once the gate pulses are reapplied.

BRIEF DESCRIPTION OF THE DRAWINGS

FIG. 3 is a schematic circuit diagram of the on/off controller block shown in the control section of the phase controlled regulator of FIG. 1.

FIG. 3a is a binary truth table for the binary values associated with the reference points of FIG. 3.

FIG. 4 is a schematic circuit diagram of the walk-in circuitry block shown in the control section of the phase controlled regulator of FIG. 1.

DETAILED DESCRIPTION OF THE PREFERRED EMBODIMENT

Figure 1:
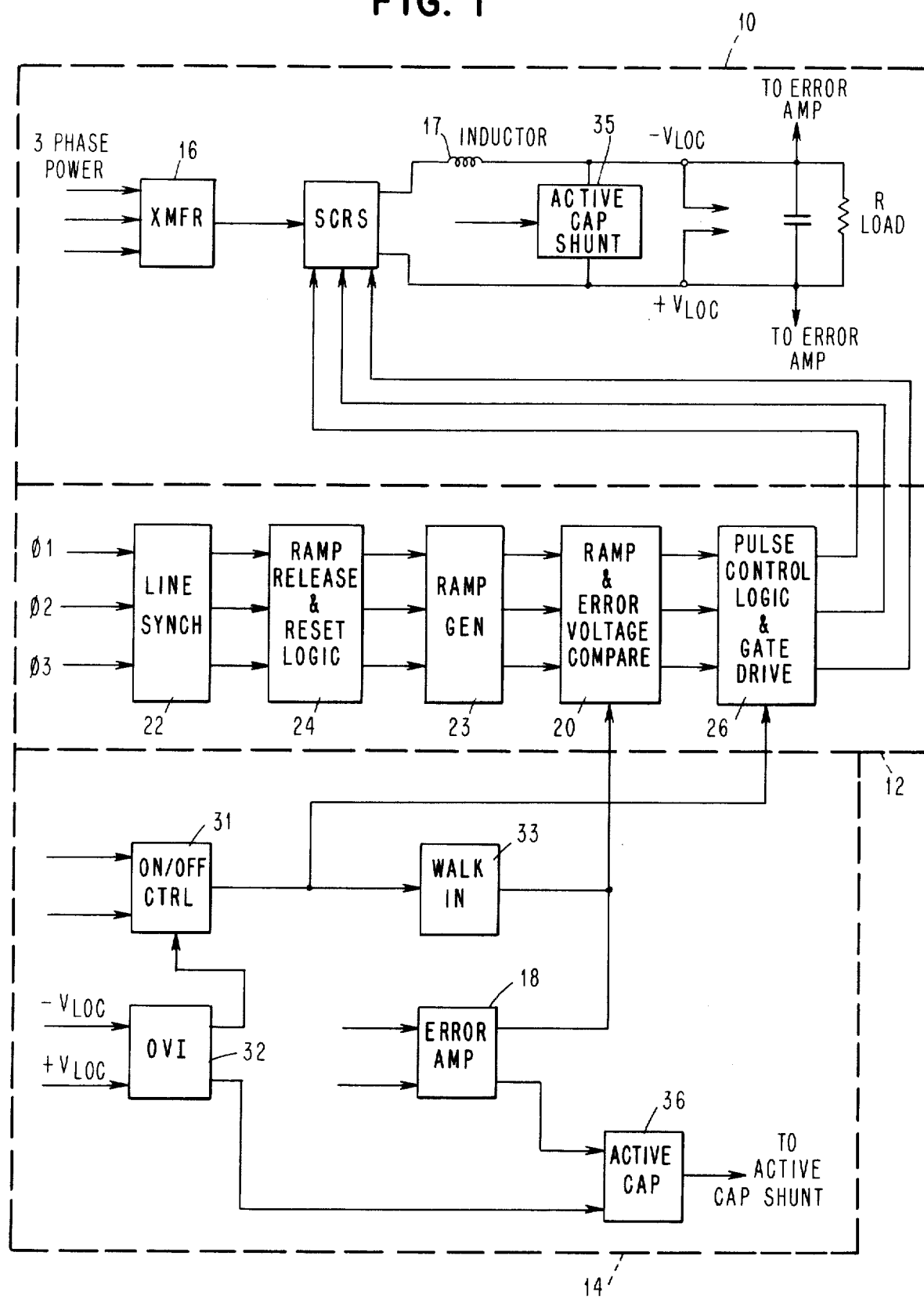
FIG. 1 is a block diagram of the control, timing and power sections of a phase controlled regulator.

Referring to FIG. 1, there is shown a block diagram of a three phase, SCR phase controlled regulator which includes the over-voltage interrupt of the present invention. The three phase, SCR phase controlled regulator is shown as having a power section 10, a timing section 12 and a control section 14. In order to better understand the function of the over-voltage interrupt circuit in the phase controlled regulator, the operation of the SCR, phase controlled regulator operation will be described briefly in connection with FIG. 1. The three phase power on the input power line is coupled to the voltage regulator by a transformer 16 which applies the power to the SCRs. The firing angles of the SCRs are controlled to conduct and pass power to the load. The voltage at the load can vary for various reasons and accordingly, the changes in voltage thereacross are sensed and compared with an accurate reference voltage at the input to the error amplifier where the difference between the sensed voltage and reference voltage are amplified and fed as error signals to a ramp and error voltage compare circuit in the timing section. The timing section is described and is shown in detail in U.S. Pat. No. 3,986,047, filed Dec. 22, 1975 and issued Oct. 12, 1976. In the timing section, the three phase inputs are received from an input transformer (not shown) at the line synchronizer 22 which essentially synchronizes the three phase signals so as to have the proper timing relationship with respect to one another. The three phase outputs from the line synchronizer 22 are connected to the ramp release and reset logic circuit 24 which generates the control or timing pulses for generating a ramp by ramp generator 23. The purpose of the ramp release and reset logic 24 is to control the start and stop or release and reset of the ramp. It will be appreciated that if the ramp starts at different points, it crosses an off-set line which may represent an error voltage at different distances along the ramp. For example, the ramp generated in the regulator is compared with a feedback error voltage obtained from the output of the error amplifier. A pulse is generated at the intersection of the ramp and the error voltage. The distance along the time axis, which is the zero line of the ramp, is known as the firing angle, since the pulse generated at the intersection of the ramp and error voltage is used to fire the silicon controlled recitifiers through their gates. This pulse generated in the ramp and error voltage comparator 20 is sent to the pulse controlled logic gate drive circuit 26 where it is steered to the appropriate SCR gate. The variations of the output voltage of the regulator are sensed and compared with a fixed reference voltage to develop an error signal which is amplified in error amplifier 18 and used as the error voltage in the ramp generator in error voltage comparator 20. It should be appreciated, that as the error voltage becomes more positive, the firing angle increases since the interception of the ramp and the error voltage is further up on the ramp. This causes the firing angle to increase which causes the SCRs to conduct later in the sine wave. This reduces the output voltage and is called phasing back. A decreasing error voltage fires the SCRs earlier which increases the output voltage. This is known as phasing forward. The walk-in circuit 33 prevents the regulator from turning on abruptly by initially clamping the error voltage positive and slowly reducing the error voltage during turn-on until it finds its own regulating level. The off/on function controls the gate drive and walk-in circuits. Turn-off immediately inhibits the gate pulses, and via the walk-in circuit, forces a fast phase back. Upon turn-on, the SCR gate pulses are applied immediately and slowly phased forward by the walk-in circuit.

Over-voltage interrupt (OVI) circuit 32 of the present invention is shown in the control section 14 of the voltage regulator. In response to an over-voltage condition sensed at the local voltage output −VLOC and +VLOC shown at the output of the SCRs in the power section 10 of the voltage regulator, the OVI circuit 32 puts out a signal which overrides the on mode operation of the on/off control 31. The turning off of the on/off control 31 immediately inhibits the gate pulses to the SCRs and forces a phase back to a firing angle that will guarantee a soft turn-on. The OVI circuit 32 also puts out a signal which turns off the active capacitor shown as active cap block 36. This control block 36 activates and deactivates the active cap shunt 35 shown in the power section 10. The active capacitor 36 is a circuit which electronically provides the characteristics of a high capacitance but lacks storage ability. This small amount of circuitry replaces what would generally be a very large capacitor to provide the required ripple filtering in conjunction with inductor 17. The OVI circuit 32 essentially switches back to its initial output upon the input over-voltage subsiding to a reset threshold value which is a predetermined amount lower than the tripping threshold value. When the input voltage to the OVI circuit 32 reaches this below normal threshold level, the output therefrom turns the on/off control back on. At this turn-on time of the on/off control circuit, the walk-in circuit is already phased back to a low voltage and normal walk-in occurs, that is, the error voltage is slowly reduced causing the firing angle to phase forward increasing the voltage until the regulating value is reached. The active capacitor control circuit 36 does not turn back on as long as the over-voltage persists. Thus, the regulator is held in a controlled repetitive off/on sequence until the over-voltage subsides, or the regulator is turned off.

Figure 2:
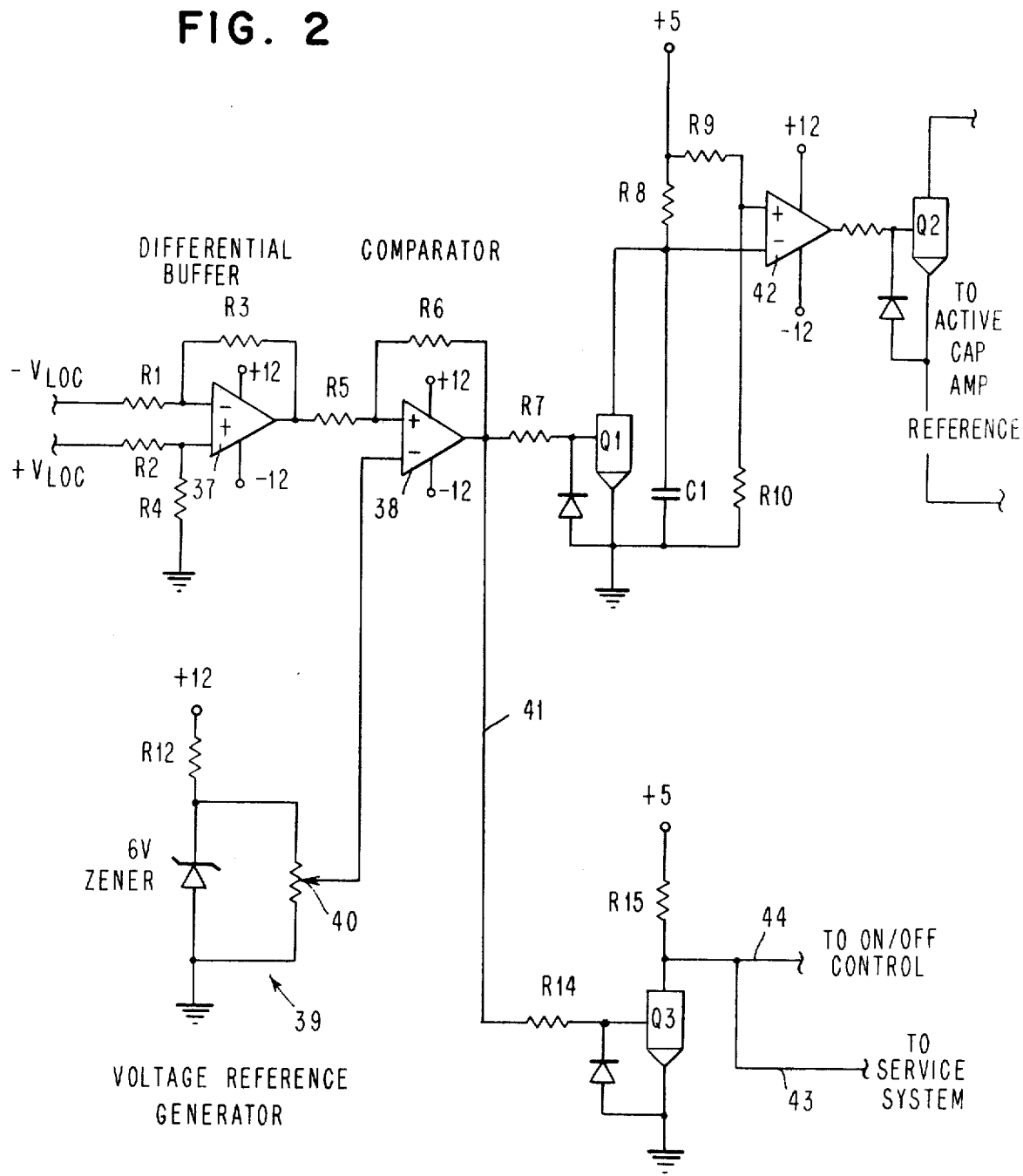
FIG. 2 is a schematic circuit diagram showing the over-voltage interrupt circuit in the control section of the phase controlled regulator of FIG. 1.

The details of the OVI circuit are shown in FIG. 2. The circuit senses the local output of the regulator with a differential inverting buffer amplifier 37 having a gain of one. The −VLOC input is connected to the invert terminal (−) of the differential buffer and the +VLOC voltage is connected to the non-inverting terminal (+). The (+) terminal is connected to ground through resistor R4. The output voltage value obtained from the differential buffer 37 is determined by the amount of difference between thesensed input voltages and is equal but opposite in polarity to the input voltage. The output from the differential buffer 37 is connected to the non-invert (+) terminal of a positive feedback comparator stage 38. A reference voltage obtained from a voltage reference generator 39 is connected to the invert (−) terminal of comparator 38. The voltage reference is obtained from the variable potentiometer 40 which is set at some value less than 6 volts. This reference input establishes the over-voltage trip threshold of the comparator. As long as the voltage applied to the (+) terminal is less positive than the reference, the comparator puts out a negative-level. In the over-voltage condition the input to the (+) terminal of the comparator 38 will go more positive than the reference. At this crossover point, an up-level output is produced at the comparator output. This positive voltage output is maintained until the voltage on the (+) terminal drops below a predetermined lower reset value. The comparator 38 has a positive feedback from the output through resistors R6 to the (+) terminal. This small positive voltage added at the plus terminal by the feedback proportionately lowers the point at which the voltage at the positive terminal goes below the reference. In other words, the reset threshold is made less than the tripping or setting threshold by a positive offset amount determined by the positive feedback around the comparator. This is an important feature since this so called hysteresis establishes the resetting threshold of the regulator in the over-voltage and off interrupt mode and forces the regulator output to decay to a lower value. Without hysteresis the OVI circuit would try to regulate at the OV trip voltage. The positive voltage level output of the comparator obtained when the regulator is in the over-voltage condition, is connected to the base of transistor Q3 via connector 41. The positive voltage level biases the NPN transistor Q3 into its saturated condition such that the output from the collector to the on/off control is at a down-level. Normally transistor Q3 is biased off such that the output to the on/off control is normally high. There is also a connector 43 from the collector of transistor Q3 to a service system which analyzes this output to determine what action should be taken. For example, after a certain number of off/on cycles the service system may decide to shut down the regulator. The output from the comparator 38 is also utilized to control the turn-off of the active capacitor when an over-voltage is sensed. The over-voltage results in a positive voltage level output from the comparator which biases NPN transistor Q1 into the saturation state. When transistor Q1 is in the non-conducting state the invert terminal of comparator 42 is maintained at approximately 5 volts. The non-invert terminal is maintained at 4 volts via the resistors R9 and R10. As long as this voltage polarity difference is maintained at the two input terminals of the comparator 42 the output is maintained negative due to the (+) input being more negative than the (−) input. This negative output from comparator 42 biases NPN transistor Q2 into the off state such that an up-level is continually applied to the active capacitor amplifier reference. This up-level, or off condition, is essentially an open circuit and does not alter the normal operation of the active cap amplifier. When the output of comparator 38 is at an up-level due to the sensing of an over-voltage, Q1 is biased into saturation providing a discharge path for capacitor C1. This brings the invert terminal of comparator 42 to a voltage level well below the 4 volts maintained at the non-invert terminal. At the point where the voltage at the invert terminal goes below that of the non-invert terminal, the voltage level output of the comparator 42 changes from a down-level to an up-level which biases transistor Q2 to its conducting state, thereby, shorting the active cap reference and turning off the active cap. This off-level of the active capacitor amplifier is maintained as long as the regulator is in the over-voltage interrupt mode due to the long time constant of R8 and C1. When the comparator 38, due to the voltage dropping below the reset threshold, produces a down-level output, transistor Q1 is biased into its non-conducting or off condition, thus, allowing capacitor C1 to begin charging towards 5 volts. However, there is a long R8C1 time constant (500 MS to get to 4V). Therefore, capacitor C1 is continually held below 4 volts during the over-voltage interrupt cycle. This action maintains the invert terminal of amplifier 42 below the 4 volts maintained at the non-invert terminal. Accordingly, the active capacitor amplifier is maintained off as long as the regulator is in the over-voltage interrupt mode. It is necessary to maintain this active capacitor off during the over-voltage interrupt mode, since the active cap tries to regulate during the OVI mode and introduces a large ripple.

Referring to FIG. 3, there are shown the details of the on/off control circuit 31 which is overridden by the output on line 44 from the over-voltage interrupt circuit 32. The on/off control circuit requires two binary bits to perform the set or reset operation. The set condition or on condition is represented by a 10 condition on input lines A and B, respectively. The reset condition or off condition is represented by a 01 condition on input lines A and B, respectively. A POR (power on reset) circuit sets the on/off control latch 46 to the off state when the +5 volt bias is first applied to the regulator control circuitry. When the +5 volt bias is first applied, the output of comparator 48 is a down-level since the inverting input is more positive than the non-inverting input. When the +5 volt bias reaches approximately 3.6 volts, Zener diode 50 breaks down and the non-invert terminal switches more positive than the invert terminal input causing the output from comparator amplifier 48 to switch positive and to remain positive as long as the +5 volt bias is present. This initial down-level pulse applied to the NAND gate 52 initializes the latch 46 output to the up-level. The truth table shown FIG. 3a shows the binary levels at various locations in the on/off control circuit. When input A is at an up-level (1) and input B is at a down-level (0) output $\bar{Z}$ switches high and conditions the pulse control gate. Simultaneously, output Z switches low and starts the walk-in circuit (FIG. 4). When input B is high (1) and A is low (0) the on/off latch 46 is reset causing NAND circuit 52 output Z to switch to a high level or up-level (1) and output $\bar{Z}$ following inverter 56 to switch to a low voltage level (0), thus inhibiting the gate pulses and turning off the walk-in circuit via line 58. The operation of the circuit can best be seen by following through the circuit when the A input is 1 and the B input is 0 which represents an on condition. The 1 input is applied to NAND circuit 60. The B input or 0 input is inverted by inverter 61 and is applied as an up-level to the other input of NAND circuit 60. The inverted output from NAND circuit 60 is a down-level which is applied to NAND circuit62 as one of the inputs to latch circuit 46. The other input to NAND circuit 62 is a feedback 63 from the output of the latch which guarantees that the latch remains set regardless of the condition at the other input. If all the other inputs to NAND circuit 52 are in the up voltage level state, the NAND circuit 52 will produce an output which is a latched down-level. This down-level is applied through the feedback to NAND circuit 62, as previously mentioned, and is also connected via connection 58 to the walk-in circuit 33. The output from the latch 46 is also inverted in inverting amplifier 56 to give the $\bar{Z}$ output as an up voltage level which represents an on condition to the pulse control gate block 20 in FIG. 1. The (1) input at input A is also inverted in inverter 64 which produces a down-level (0) input to NAND circuit 65 along with the down-level from input B. These two down-level inputs to NAND circuit 65 produce an up-level which is utilized as an input to NAND circuit 52. This arrangement ensures that the circuit only responds to the 10 combination and no other for an on condition. If an on condition is present at the input to the on/off control circuit (A = 1, B = 0) and the OVI circuit is activated, the input on line 44 switches low and turns off the regulator via the on/off latch 46. When the regulator output drops to the lower OVI threshold, the OVI output on line 44 switches to a high voltage level and the regulator again turns on via on/off latch 46. As long as the over-voltage condition exists, the OVI output on line 44 cycles the regulator off and on thus overriding the on signal present at the input of the on/off control circuit 31.

Before turn-on, the input to the walk-in circuit on line 58 from the on/off latch 46 is at a high voltage level causing transistors 66 and 67 to be biased into the conducting state. The resistor divider consisting of resistors 68 and 69 initially set the non-invert (+) input of operational amplifier 70 at 7 volts. Resistor 71 and diodes 72 and 73 comprise a 2.1 volt clamp. The operational amplifier 70 is configured in a voltage follower arrangement. Diode 75 is a clamp which provides isolation between the walk-in circuit and the error amplifier 18. The cathode side of diode 75 connects to the error voltage output of the error amplifier which is greater than or equal to 6 volts in the phase back or off condition. When the regulator is turned on, it senses zero volts at the output sense points across the load and tries to phase completely forward to increase the voltage output of the regulator to its maximum to satisfy the maximum error obtained between the voltage at the sense point and the internal reference voltage. Since the voltage follower output of operational amplifier 70 is 7 volts, diode 75 clamps the error voltage to 6.3 volts instead of allowing it to switch abruptly to a lower voltage (approximately 3 volts). Simultaneously, the input to the walk-in circuit at diode 76 switches to a down-level and transistors 66 and 67 are biased to a non-conducting state. Capacitor 78 slowly charges at a rate determined by resistor 69, and the voltage at the input, and likewise the output, of operational amplifier 70 changes at a controlled rate from +7 volts to 2.1 volts. Diode 75 is forward biased and forces the error voltage to adjust slowly to the regulating value, greater than or equal to 3 volts. Since the output of the operational amplifier 70 eventually drops to 2.1 volts, diode 75 becomes reverse biased and isolates the walk-in circuit from the error voltage during normal regulator operation. During a normal turn-off, transistor 67 is biased to turn-on and discharges capacitor 78 through resistor 68 and capacitor 79 causing a complete phase-back.

When the OVI circuit is in the activated mode, transistor 67 in the walk-in circuit is repetitively cycled on and off. Capacitor 79 is a speedup capacitor and provides an AC bypass of resistor 68. This causes a momentary low impedance shunt around resistor 68 and discharges capacitor 78 abruptly for a short duration until capacitor 79 charges up, at which time the discharge is much slower through resistor 68. This combination causes a partial abrupt phase-back of the regulator such that when the OVI resets the regulator, it does not turn on suddenly causing voltage overshoots and current surges.

While the invention has been particularly shown and described with reference to the embodiments thereof, it will be understood by those skilled in the art that the foregoing and other changes in form and detail may be made therein without departing from the spirit and scope of the invention.

What is claimed is:

1. In a phase controlled regulator an over-voltage interrupt circuit comprising in combination:
   a sensing means for sensing the outputs of the phase controlled regulator and for generating a voltage proportional to the voltage difference between the outputs;
   a reference generator for generating a reference;
   a comparator means having the reference connected thereto as one input for establishing an upper threshold and having positive feedback establishing a resetting threshold lower than said setting threshold;
   an on/off controller means for controlling the on and off switching of said regulator;
   a first switching means for providing an override signal to said on/off controller which turns said regulator off in response to a sensed output above said setting threshold and turns said regulator on in response to a sensed output below said resetting threshold, thereby providing output voltage off/on sequencing between said setting and resetting threshold values in response to an over-voltage.

2. In a phase controlled regulator an over-voltage interrupt circuit according to claim 1, wherein said sensing means for sensing the outputs of the phase controlled regulator and for generating a voltage proportional to the voltage difference between the outputs is a differential buffer circuit.

3. In a phase controlled regulator according to claim 1, wherein said comparator has an inverting (−) and non-inverting (+) terminal, the reference means generating a positive reference connected to said inverting terminal, the output of said sensing means being connected to the non-inverting terminal of said comparator so that the comparator changes output level when the output of said sensing means goes more positive than said reference level.

4. In a phase controlled regulator according to claim 3, wherein said comparator has a positive feedback from the output thereof to said non-inverting input to introduce a fixed positive offset such that the comparator will reset at the offset value lower than said reference.

5. In a phase controlled regulator according to claim 1, wherein said first switching means for providing an override signal to said on/off controller is a transistor which is saturated in response to an over-voltage condition sensed by said sensing means thereby providing an override signal to said on/off controller.

6. In a phase controlled regulator according to claim 1, wherein a second switching means is provided including a second and third transistor, a capacitor and a further comparator said second transistor saturating in response to said over-voltage condition to provide a discharge path for said capacitor, said further comparator responding to said capacitor discharge by changing its output to bias said third transistor to its conducting state causing the active capacitor to turn off.

7. In a phase controlled regulator according to claim 6, wherein the charging time of said capacitor is longer than the cycling time of the over-voltage interrupt circuit so that the capacitor does not reach the critical charge for changing said further comparator output while said regulator is responding to an over-voltage condition, thereby maintaining said third transistor in a non-conducting state and maintaining the active capacitor in the off condition.

8. In a phase controlled regulator according to claim 1, wherein a walk-in circuit is provided which operates in response to said override signal from said first switching means to provide a positive increase in error voltage to cause fast phase back of said regulator voltage.

9. In a phase controlled regulator according to claim 8, wherein said walk-in circuit operates in response to the removal of said override signal from said first switching means to provide said error voltage at the phase back level upon turn-on to provide a slow phasing forward by slowly decreasing said error voltage until the regulating level is reached thereby preventing voltage overshoot from the regulator.

* * * * *